US010370973B2

(12) United States Patent
Heikurinen et al.

(10) Patent No.: US 10,370,973 B2
(45) Date of Patent: Aug. 6, 2019

(54) COMPRESSOR AIRFOIL WITH COMPOUND LEADING EDGE PROFILE

(71) Applicant: PRATT & WHITNEY CANADA CORP., Longueuil (CA)

(72) Inventors: Kari Heikurinen, Oakville (CA); Ron Dutton, Guelph (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 882 days.

(21) Appl. No.: 14/725,879

(22) Filed: May 29, 2015

(65) Prior Publication Data
US 2016/0348692 A1    Dec. 1, 2016

(51) Int. Cl.
F01D 5/12         (2006.01)
F01D 5/14         (2006.01)
F04D 29/32        (2006.01)
F04D 29/54        (2006.01)
F02C 3/04         (2006.01)
F04D 19/02        (2006.01)
F04D 29/38        (2006.01)

(52) U.S. Cl.
CPC ............ F01D 5/141 (2013.01); F01D 5/142 (2013.01); F02C 3/04 (2013.01); F04D 19/022 (2013.01); F04D 29/324 (2013.01); F04D 29/384 (2013.01); F04D 29/544 (2013.01); F05D 2220/32 (2013.01); F05D 2240/303 (2013.01); F05D 2240/306 (2013.01); F05D 2250/70 (2013.01); F05D 2250/73 (2013.01)

(58) Field of Classification Search
None
See application file for complete search history.

(56) References Cited

U.S. PATENT DOCUMENTS 2,406,499 A     8/1948  Jandasek
3,697,193 A *  10/1972  Phillips .................... B64C 3/14
                                              416/223 R
(Continued)

FOREIGN PATENT DOCUMENTS

CA    2794900 A1    5/2013
EP    3098383 A1   11/2016

Primary Examiner — Woody A Lee, Jr.
Assistant Examiner — Jason A Fountain
(74) Attorney, Agent, or Firm — Norton Rose Fulbright Canada LLP

(57) ABSTRACT

A compressor airfoil of a gas turbine engine includes a pressure side and a suction side of the airfoil extending downstream from a stagnation point, the suction side including a suction side surface portion within a leading edge region, and a main suction side airfoil surface downstream from the suction side surface portion and extending contiguously therewith. The suction side surface portion having a compound curvature profile which includes at least a leading edge having a first curvature profile and a chamfered surface having a second curvature profile different from the first curvature profile. The chamfered surface being contiguous with and extending immediately downstream from the leading edge. The first curvature profile being curved. The second curvature profile of the chamfered surface being substantially flat and defining a substantially straight-line profile in a cross-section transverse to the span-wise axis of the airfoil.

16 Claims, 5 Drawing Sheets

(56) References Cited

U.S. PATENT DOCUMENTS

| | | | |
|---|---|---|---|
| 3,993,414 A | 11/1976 | Meauze et al. | |
| 4,595,340 A | 6/1986 | Klassen et al. | |
| 5,108,261 A | 4/1992 | Ress, Jr. et al. | |
| 5,501,575 A | 3/1996 | Eldredge et al. | |
| 6,572,335 B2* | 6/2003 | Kuwabara | F01D 5/187 416/96 A |
| 6,722,847 B2 | 4/2004 | Freeman et al. | |
| 7,721,526 B2 | 5/2010 | Fujimura et al. | |
| 7,748,950 B2 | 7/2010 | Kodama et al. | |
| 7,918,652 B2 | 4/2011 | Fujimura | |
| 8,366,382 B1* | 2/2013 | Muldoon | F01D 11/02 415/111 |
| 2011/0097210 A1 | 4/2011 | Kirtley | |
| 2014/0348630 A1* | 11/2014 | Baltas | F02K 1/09 415/1 |

* cited by examiner

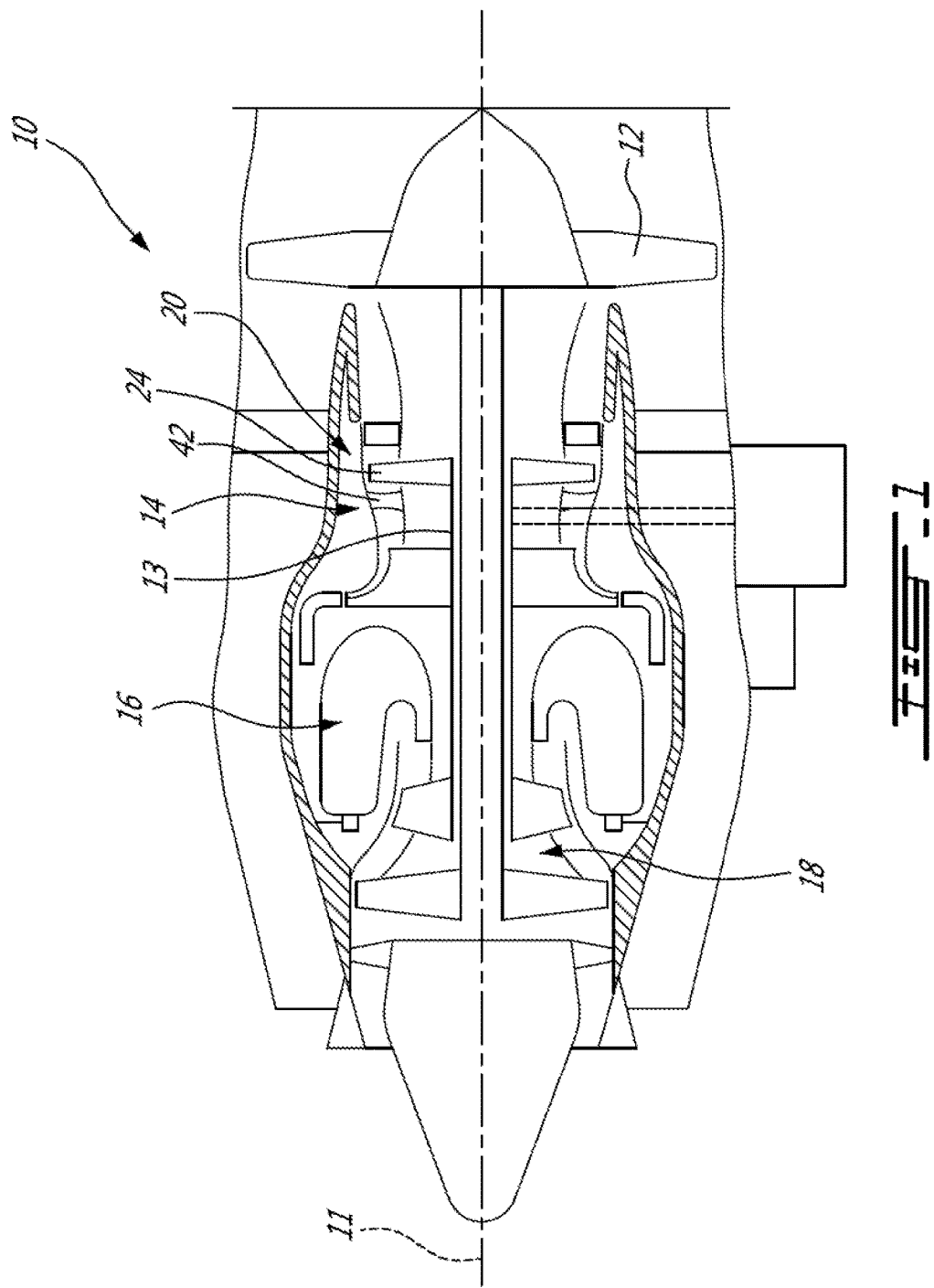

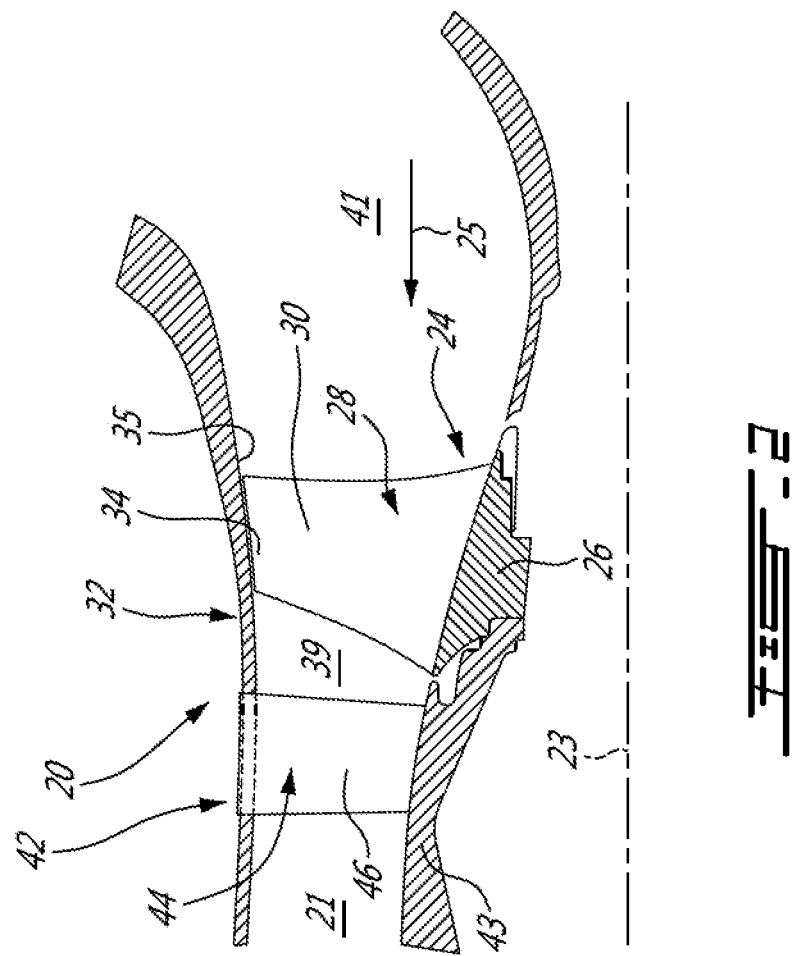

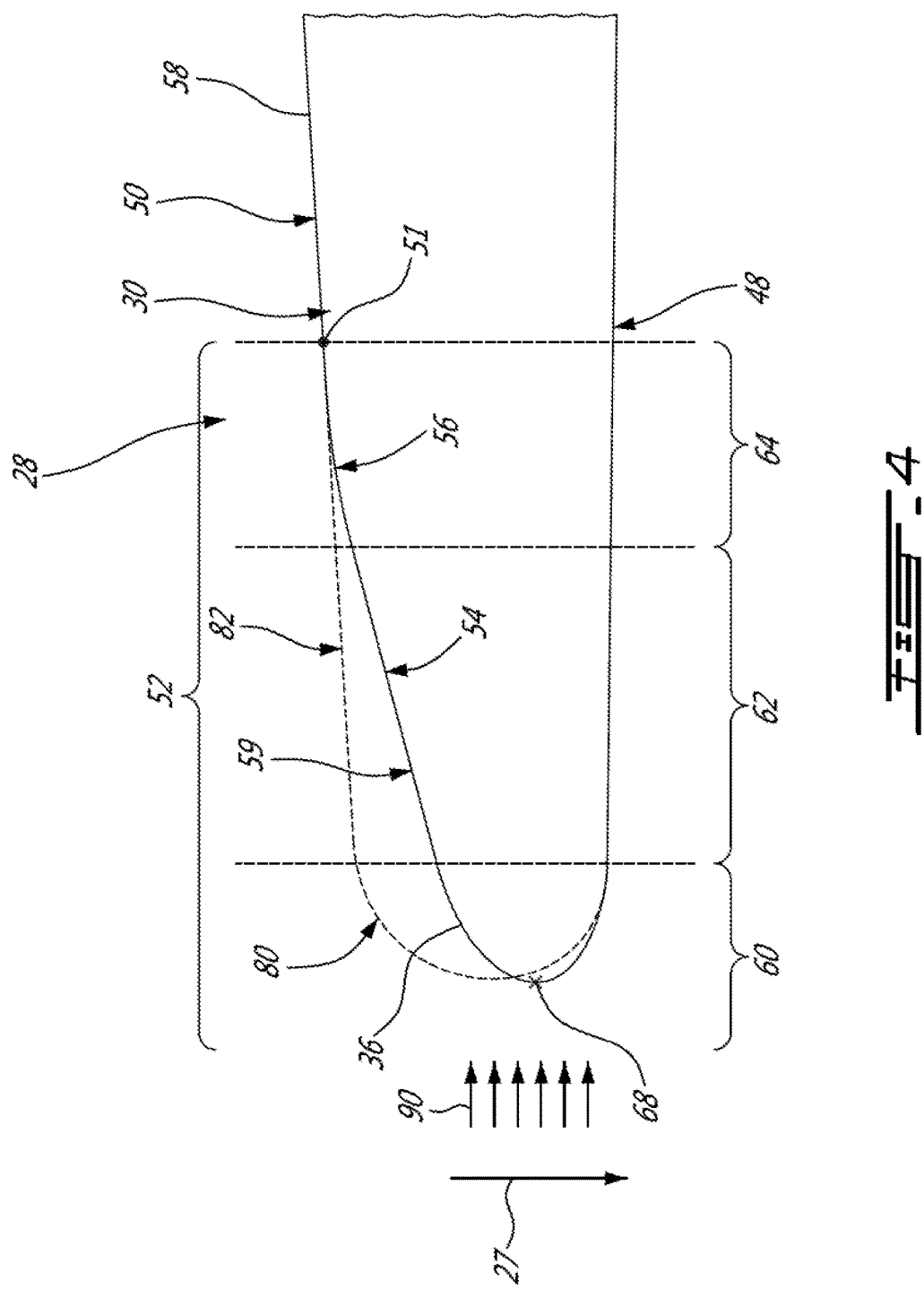

COMPRESSOR AIRFOIL WITH COMPOUND LEADING EDGE PROFILE

TECHNICAL FIELD

The application relates generally to compressors of gas turbine engines and, more particularly, to compressor airfoils.

BACKGROUND

Many different parameters of compressor airfoils can influence aerodynamic performance of the compressor. For example, the leading edge shape of each airfoil affects the incident angle of the air on the stator vanes and/or rotor blades, which may help to delay the onset of airfoil stall and thus possibly improve the surge margin of the compressor.

Continual improvement in compressor airfoil design is sought, in order to seek improvements in compressor aerodynamic performance.

SUMMARY

There is provided a compressor airfoil of a gas turbine engine, the compressor airfoil defining a span-wise axis and comprising: a pressure side and a suction side extending downstream from a stagnation point; the suction side including a suction side surface portion within a leading edge region, and a main suction side airfoil surface downstream from the suction side surface portion and extending contiguously therewith; and the suction side surface portion having a compound curvature profile, the compound curvature profile comprising at least a leading edge having a first curvature profile and a chamfered surface having a second curvature profile different from the first curvature profile, the chamfered surface being contiguous with and extending immediately downstream from the leading edge, the first curvature profile being curved, the second curvature profile of the chamfered surface being substantially flat and defining a substantially straight-line profile in a cross-section transverse to the span-wise axis of the airfoil.

There is also provided a compressor of a gas turbine engine, the compressor comprising: at least one compressor rotor having a hub and a plurality of circumferentially spaced rotor blades extending from the hub, the hub defining a central axis of rotation of the compressor rotor, each of the rotor blades having a first airfoil extending through an annular gas path of the compressor, between the hub and an outer blade tip; at least one compressor stator disposed downstream from the compressor rotor, the compressor stator having a plurality of circumferentially spaced stator vanes, each of the stator vanes having a second airfoil extending through the gas path; and at least one of the first and second airfoils comprising: opposed pressure and suction sides extending radially from root to tip and extending axially between leading and trailing edges, a stagnation point being defined on said leading edge, and a plurality of stacked transverse sections having respective chords extending between said leading and trailing edges, the suction side in said transverse sections having a generally convex shape; and wherein at least one of said transverse sections having a profile with a substantially flat section extending between the leading edge and the suction side convex shape, the profile having decreasing curvature from the leading edge towards the substantially flat section to merge therewith, and the substantially flat section merging with the suction side convex shape downstream therefrom.

There is further provided a compressor airfoil of a gas turbine engine comprising: a leading edge region defined between a pressure side and a suction side of the airfoil, the leading edge region defining a stagnation point and extending downstream therefrom on both the pressure and suction sides; and the suction side including a suction side surface portion within the leading edge region extending continuously and uninterrupted to interconnect the stagnation point and a main suction side airfoil surface disposed downstream of said suction side surface portion, said suction side surface portion having a compound curvature profile, the suction side surface portion having the compound curvature profile comprising at least a curved leading edge surface and a flat chamfered surface contiguous with and extending downstream from the curved leading edge surface, the curved leading edge surface having a first curvature profile and the flat chamfered surface having a second curvature profile different from that of the curved leading edge surface, the second curvature profile of the flat chamfered surface representing an infinite radius of curvature, the flat chamfered surface defining a substantially straight-line profile in a cross-section transverse to the span-wise axis of the airfoil.

BRIEF DESCRIPTION OF THE DRAWINGS

Reference is now made to the accompanying figures in which:

FIG. 1 is a schematic cross-sectional view of a gas turbine engine;

FIG. 2 is a partial cross-sectional view of a compressor of the gas turbine engine of FIG. 1;

FIG. 3b is a partial front view of the rotor of FIGS. 2 and 3a, taken from direction 3b-3b of FIG. 3a;

FIG. 4 is a partial cross-sectional view of the airfoil of the rotor of FIGS. 3a-3b, taken through line 4-4 of FIG. 3a.

DETAILED DESCRIPTION

Figure 3A:
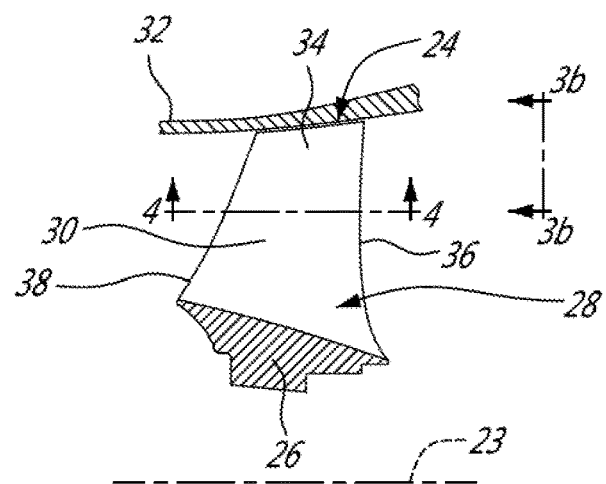
FIG. 3a is an enlarged, cross-sectional view of a rotor of the compressor of FIG. 2.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The multistage compressor section 14 includes one or more axial compressors 20, as will be further described. Although a turbofan engine is depicted, it will be understood however that the gas turbine engine 10 as described herein may comprise other types of gas turbine engines such as turboshaft, turbo-prop and/or auxiliary power units. A longitudinal engine centerline 11 extends through the center of the engine 10, and at least the rotating components of the fan 12, the compressor section 14 and the turbine section 18 are concentric with and rotate about the engine centerline 11.

The compressor section 14 (or simply "compressor") of the gas turbine engine 10 may be a multi-stage compressor, and thus may comprise several axial and/or centrifugal compressors arranged in serial flow communication. Although the present disclosure will focus on an axial compressor 20, i.e. having an axial turbo machine rotor 24, it is to be understood that the compressor as described herein may also be a centrifugal compressor (e.g. an impeller) and/or a mixed flow rotor.

Referring to FIG. 2, each axial compressor 20 of the compressor section 14 of the gas turbine engine 10 includes at least one rotating axial rotor 24 and a rotationally-stationary stator 42 immediately downstream from the rotor 24. The rotor 24 and stator 42 as described herein may form a stage of the high pressure compressor (HPC) of the gas turbine engine 10, although could similarly form part of another stage in the compressor, including the low pressure compressor stages for example.

The rotor 24 and the stator 42 respectively have a plurality of circumferentially disposed airfoils 30 and 46, as will be seen in more detail below, extending through the annular gas path 39. The compressor gas path 39 is defined by the compressor inlet passage 41 upstream of the rotor 24 and the compressor discharge passage 21 downstream of the stator 42. The gas flowing in direction 25 through the gas path 39 is accordingly fed to the compressor 20 via the compressor inlet passage 41 and exits therefrom via the compressor discharge passage 21. The radially inwardly facing wall 35 of the outer shroud 32 defines a radial outer boundary of the annular gas path 39 through the compressor 20.

The rotor 24 rotates about a central axis of rotation 23 within the stationary and circumferentially extending outer shroud 32, disposed radially outward of the rotor 24. The axis of rotation 23 of the compressor rotor 24 is at least parallel to, and may be coaxial with, the main engine axis 11 of the gas turbine engine 10 (see FIG. 1). The rotor 24 includes a central hub 26 and a plurality of rotor blades 28 extending in a span-wise direction, substantially radially, away from the hub 26 and circumferentially spaced apart thereabout. Each of the rotor blades 28 defines and a rotor airfoil 30 which extends from the hub 26 and terminates at a remote outer blade tip 34 immediately adjacent, and radially inward of, the outer shroud 32. The hub 26 may be mounted, directly or indirectly, to a rotating shaft 13 of the engine 10 (see FIG. 1).

The stator 42 similarly includes a plurality of stator vanes 44 which are stationary and extend through the annular gas path 39 from an inner shroud 43 to the outer shroud 32. The stator vanes 44 extend in a span-wise direction, substantially radially, away from the inner shroud 43 and are circumferentially spaced apart from each other throughout the annular gas path 39. Each of the stator vanes 44 defines a stator airfoil 46 which extends between the inner shroud 43 to the outer shroud 32.

Accordingly, both the stator airfoils 46 and the rotor airfoils 30 (collectively "airfoils" as used herein) of the compressor 20 define aerodynamic airfoil surfaces which affect the performance of the compressor. While only the airfoil 30 of the rotor 28 will be described in more detail hereinafter for the sake of simplicity, it is to be understood that the following structural features of the rotor airfoil 30 may also (or instead) be applied to the stator airfoil 46 and/or other suitable airfoils of the engine 10, such as those of the fan 12.

Flow around the airfoils 46, 30 of the compressor 20 is complex. Depending on the shape of the airfoils 46, 30 and the flow conditions, transonic flow may be present in the compressor section 14 (i.e. existence of subsonic flow in some portions of the compressor section 14, and sonic and supersonic flow in other portions of the compressor section 14). The present inventors have found that by modifying the shape of the leading edges of these airfoils 46, 30, for example on the suction sides thereof, aerodynamic improvements may be possible.

Figure 3B:
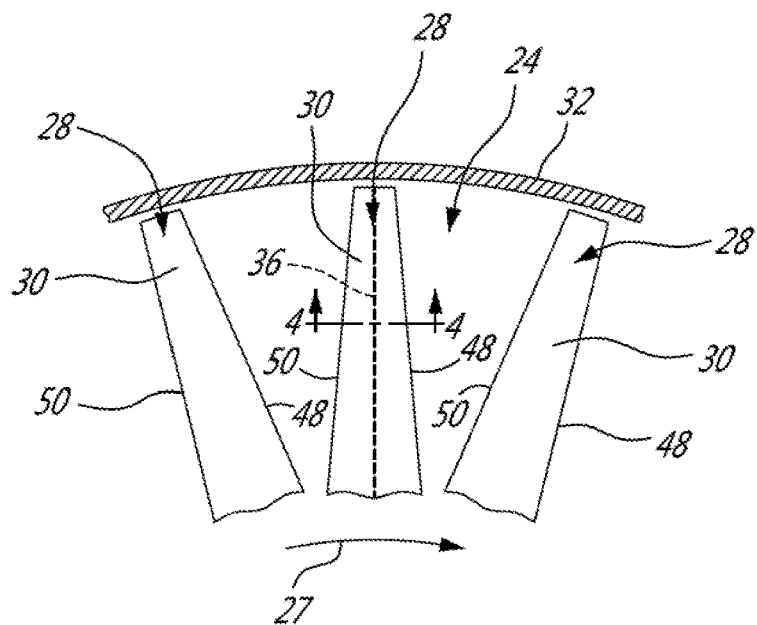

Referring now to FIGS. 3a and 3b, the rotor 24 of the compressor 20 will now be described in further detail. As noted above, the rotor 24 includes a plurality of circumferentially spaced apart rotor blades 28 extending outwardly away from the hub 26. Each of these rotor blades 28 defines an airfoil 30, the airfoil extending in the span-wise direction between the hub 26 and the remote outer tip 34 of the blade and extending in a chord-wise direction between an upstream leading edge 36 and a downstream trailing edge 38. In one embodiment, although not necessarily, the span-wise direction may be radially extending and substantially perpendicular to the axis of rotation 23 of the rotor 24, and the chord-wise direction will be substantially parallel to the axis of rotation 23.

As seen in FIG. 3b, the leading edge 36 of each of the airfoils 30 of the rotor blades 28 is disposed between the opposed pressure side surface 48 and the suction side surface 50 of the airfoil. The pressure side surface 48 may be generally concave in shape and the suction side surface 50 may be generally convex in shape. The rotation of the compressor rotor 24 is shown in FIG. 3b by displacement of the rotor blades 28 in direction 27 about the central axis of rotation 23, and relative to the gas flow direction 25 (see FIG. 2) which may also be parallel to the axis of rotation 23.

Figure 5:
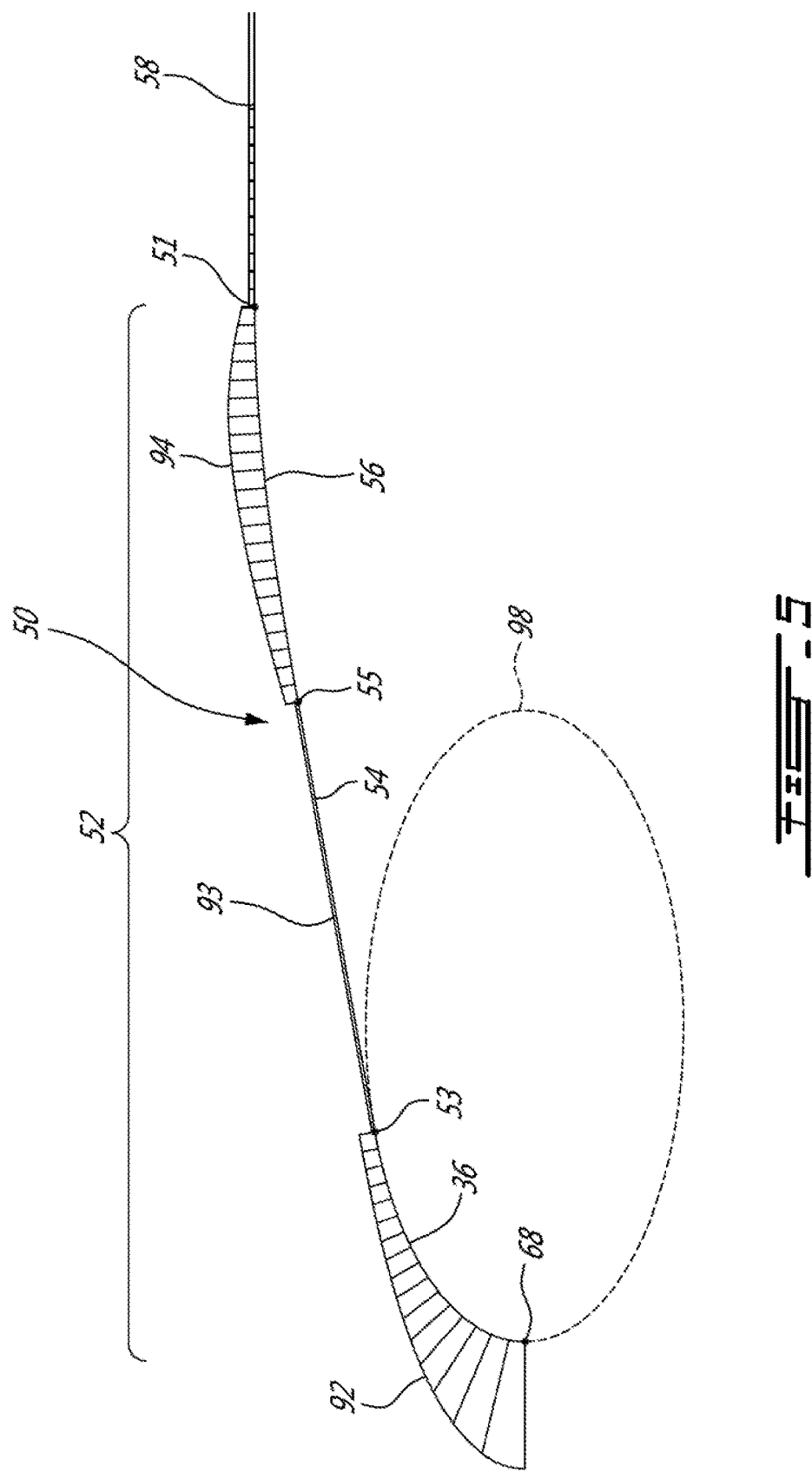
FIG. 5 is a partial cross-sectional view of the airfoil of FIG. 4, showing a curvature distribution on the suction side of the airfoil.

Referring now to FIGS. 4 and 5, which shows the airfoil in transverse cross-section in an exemplary mid-span region of the blade, the leading edge 36 and surrounding regions of the airfoils 30 will now be described in greater detail. As will be seen, the airfoils 30 of the present disclosure have a compound profile within the leading edge region 52 thereof.

The term "leading edge region" as used herein is understood to include the leading edge 36 itself, as well as the surfaces of the airfoil (either suction side or pressure side) that are immediately adjacent the leading edge 36 and which extend downstream from the stagnation point 68. The leading edge region 52 is depicted in FIG. 4, and is characterized by the presence of a leading edge curvature ($K=1/R$, where $K$=curvature and $R$=radius—see FIG. 5) extending from the stagnation point 68 of the leading edge 36 to at least the main suction side airfoil surface 58 (which may, for example, be convex). The leading edge region 52 terminates at point 51 on the suction side 50 of the airfoil 30. Point 51 therefore separates the leading edge region 52 and the main suction side airfoil surface 58. The term "compound" as applied to the profile of the leading edge region 52 is understood to mean non-constant or formed of a non-continuous curvature distribution, as shown in FIG. 5 as described in more detail below.

More particularly, and referring still to FIG. 4, the leading edge region 52 comprises the leading edge 36 itself, as well as a portion of the suction side surface 50 and pressure side surface 48 immediately adjacent the leading edge 36 and downstream therefrom relative to the direction of airflow 90. On at least the suction side 50 of the airfoil 30, the leading edge region 52 encompasses three distinct portions or sub-regions, namely: a leading edge portion 60; a chamfer portion 62; and a blended curve portion 64. The suction side surface 50 (and only the suction side surface) has a different curvature profile in each of these portions.

The pressure side surface 48, in comparison, has a pressure side surface curvature profile adjacent to the leading edge 36 that is different from the above-described curvature profiles of the suction side surface 50 within the leading edge region 52. Although the pressure side surface 48 may have any suitable shape and/or curvature profile, in at least this example the pressure side surface 48 has a single curvature (either constant or varying) throughout at least the portions 62 and 64 adjacent to the leading edge portion 60 on the pressure side surface 48.

On the suction side 50, the leading edge region 52 having a suction side surface portion 59 therein which has a compound curvature profile, and may be conceptually divided into at least three segments. These three segments correspond to the three portions 60,62,64 described earlier, each having a different profile curvature in transverse cross-section (i.e. as shown in FIG. 4) and which together form a compound curvature profile on the suction side 50 of the leading edge region 52 of the airfoil 30. This uninterrupted surface 59 on the suction side of the leading edge region is accordingly made up of the surface of the leading edge 36 in portion 60, a substantially flat (in transverse profile) or "chamfered" surface 54 in portion 62, and a blended curve surface 56 in portion 64, which are respectively disposed within the leading edge region 52.

As seen in FIGS. 4 and 5, in the leading edge portion 60, a decreasing leading edge curvature is provided from the stagnation point 68 on the leading edge 36 to merge smoothly with the flat/chamfered surface 54. In the depicted example, the curvature profile of the leading edge 36 within portion 60 defines an elliptically-shaped profile in transverse cross-section, as can be seen in FIGS. 4 and 5. However, other leading edge profiles may also be used. Alternate leading edge profiles within portion 60 may be semi-circular in shape and/or may have another constant radius of curvature. A semi-circular leading edge shape 80 is illustrated for comparison purposes in FIG. 4 using broken lines. Although the alternate leading edge shape 80 is shown as merging smoothly with surface 82, it is to be understood that a rounded (e.g. semi-circular) leading edge shape 80 having a smaller radius of curvature may be provided such as to merge with the flat/chamfered surface 54 on the main suction side airfoil surface 58.

The curvature leading edge 36, which is elliptically shaped in the depicted example, of the airfoil 30 may reduce the over-acceleration of the air incident on the airfoil (depicted by arrows 90 in FIG. 4) as it flows around the surface of the leading edge 36 from the air stagnation point 68. The stagnation point 69 is defined at the very tip of the leading edge 36 and is the point at which the velocity of the airflow 90 is substantially zero. The shape of the leading edge 36 and/or other aspects of the airfoil shape described herein, including the substantially flat (in transverse profile) surface 54 on the suction side 50 of the airfoil, may therefore enable a reduction in over-acceleration of the air as it flows downstream on the suction side away from the stagnation point 68 of the leading edge 36, which may help to reduce aerodynamic losses.

The flat surface 54 on the suction side 50 of the airfoil, located within the chamfer portion 62 of the leading edge region 52, extends contiguously downstream from the leading edge surface 36. The flat surface 54 defines a substantially flat surface portion having, in this example, a straight-line profile in the transverse cross-section seen in FIG. 4. Thus, the flat, chamfered, surface 54 defines an infinite radius of curvature. This is in contrast to typical suction side profiles, which define a continuous curve interconnecting the leading edge and the main suction side airfoil surface 58.

The flat/chamfered surface 54 may tend to create a localised negative incidence of the air flowing over this portion of the suction side surface that may help to delay the onset of airfoil stall. As noted above, the chamfered surface 54 is contiguous and uninterrupted with the upstream leading edge 36, however each surface has a different curvature and shape profile. The blended curve surface 56 on the suction side 50 of the airfoil, located within the blended curve portion 64 of the leading edge region 52, extends contiguously downstream from the chamfered surface 54 to provide an aerodynamically smooth transition to the main suction side airfoil surface 58 of the suction side 50 of the airfoil 30.

The blended curve surface 56 aims to reduce unwanted flow separation in the area, which could cause aerodynamic performance losses.

Referring specifically to FIG. 5, the curvature profile of the leading edge region 52 on the suction side 50 of the airfoil is shown in isolation, between the stagnation point 68 and leading edge region termination point 51. As described above, the leading edge region 52 of the suction side 50 of the airfoil 30 comprises a leading edge 36 having a compound curve, a flat (or "chamfered") surface 54 and a blended curve surface 56 (each within their respective portions 60, 62 and 64—see FIG. 4). The curvature of each of these three surfaces of the suction side of the airfoil 30 is different.

FIG. 5 more clearly shows the differences in curvature between these three surface portions, by depicting so-called "porcupine" plot curve lines. The use of Porcupine plot curve lines is a graphical/visual curvature analysis technique which places "quills" at regular points along a curve or curved surface. The quills may be oriented to be normal to the surface at each point, such as to be proportional to local curvature. The direction of the quill may also be determined by the Frenet frame of the curve. The relative length of each quill reflects the curvature value at that point. Accordingly, the greater the curvature of the curve at a given point (i.e. the smaller the radius of curvature), the longer the length of the quill.

The depicted porcupine curve distributions are defined by the expression $K=1/R$, where R is the radius of curvature at any point on the surface. Lines normal to the surface are proportional to local curvature. The absolute values of the curvature will however be dependent on airfoil size.

As can be seen in FIG. 5, the porcupine plot curvature profile 92 of the leading edge surface 36 shows that the curvature within this region is greatest at the stagnation point 69 and decreases continuously from there until the first transition point 53 on the suction side 50. In the exemplary embodiment of FIG. 5, the leading edge surface 36 defines an elliptical shape, and the correspondingly sized ellipse 98 is also shown for illustrative purposes.

The porcupine plot curvature profile 93 is non-existent (or almost coincident within the flat surface 54), between the first transition point 53 and a second transition point 55, because the curvature of this flat surface is substantially zero.

Between the second transition point 55 and the leading edge region termination point 51, the blended curve surface 56 defines a porcupine plot curvature profile 94 which reflects the smooth transition between the flat surface 54 and the convexly-curved shape of the main suction side airfoil surface 58 of the airfoil 30. As can be seen from the porcupine plot curvature profile 94, the curvature of the blended curve surface 56 is greatest at a point located between a second transition point 55 and the leading edge region termination point 51 (i.e. the curvature increases and then decreases within this region), but at a location closer to the point 51 than the point 55.

The above-described airfoil shape, and more particularly the suction side surface portion 59 having a compound curvature profile, may extend along all or a partial span-wise length of each of the airfoils 30. The span-wise length of the airfoils 30 may for example be defined as extending between the hub 26 and remote outer tips 34 (see FIGS. 3a-3b). In the exemplary embodiment, the suction side surface portion 59 having a compound curvature profile is disposed at least at the radially outermost ends of the airfoils 30, and may for example extend inwardly along the span-wise length of the airfoil a given distance. In one possible embodiment, the suction side surface portion 59 having the compound curvature profile described above extends span-wise from the outer tips 34 inwardly to 25% of span. Or, in other words, the suction side surface portion 59 having the compound curvature profile is disposed along 75% of the total span-wise length of each of the airfoils 30 (i.e. the radially outermost 75%).

The above-described airfoil shape may be provided to all airfoil transverse sections stacked to create a particular blade, or may be provided selectively based on desire or need. The compound curvature provided between the stagnation point of leading edge and the flat or chamfered section continuously decreases, in the sense that it does not increase substantially at any point, but the specific curvature selected may be dictated by the design. Although an elliptical shape of the leading edge suction side shape is exemplarily described above, any suitable shape may be employed, including compound radius leading edge shapes. The flat or chamfered surface has preferably an infinite-radius profile (i.e. curvature is zero) in two-dimensional transverse cross-sectional profile, but a non-infinite radius "substantially flat" profile may be also provided having a radius much larger than the suction side convex portion. The above description is meant to be exemplary only, and one skilled in the art will recognize that other changes may be made to the embodiments described without departing from the scope of the invention disclosed. The airfoils as described herein could be used either on compressor rotors (including fans) and/or compressor stator vanes, and can be provided in various parts of the compressor, for example in the high pressure compressor, low pressure compressor, or both. The shapes of the airfoils described herein are not limited to transonic rotors. In the absence of shocks, as in subsonic designs, for rear stages of multistage compressor, the airfoils as described above may still be used. Still other modifications which fall within the scope of the present invention will be apparent to those skilled in the art, in light of a review of this disclosure, and such modifications are intended to fall within the appended claims.

The invention claimed is:

1. A compressor airfoil of a gas turbine engine, the compressor airfoil defining a span-wise axis and comprising:
   a leading edge having a leading edge tip separating a pressure side of the compressor airfoil from a suction side, the pressure and suction sides extending downstream from the leading edge tip;
   the suction side including a suction side surface portion extending downstream from the leading edge tip, and a main suction side airfoil surface downstream from the suction side surface portion and extending contiguously therewith; and
   the suction side surface portion having a compound curvature profile, the compound curvature profile comprising at least a leading edge portion extending downstream from the leading edge tip and having a first curvature profile defining a continuously increasing radius of curvature and a chamfered surface having a second curvature profile different from the first curvature profile, the chamfered surface being contiguous with and extending immediately downstream from the leading edge, the first curvature profile being curved, the second curvature profile of the chamfered surface being substantially flat and defining a substantially straight-line profile in a cross-section transverse to the span-wise axis of the airfoil, the compound curvature profile further comprises a third curvature profile different from both the first and second curvature profiles, the third curvature profile defining a blended curve surface contiguous with and extending downstream from the chamfered surface, the blended curve surface also being continuous with and upstream from the main suction side airfoil surface.

2. The compressor airfoil as defined in claim 1, wherein the first curvature profile of the leading edge portion is at least partially elliptically shaped downstream of the leading edge tip.

3. The compressor airfoil as defined in claim 1, wherein the main suction side airfoil surface is at least partially convex and defines a different curvature profile than said first and second curvature profiles of the suction side surface portion.

4. The compressor airfoil as defined in claim 1, wherein the pressure side surface has a curvature profile downstream of the leading edge that is different from at least the second curvature profile of the suction side surface portion.

5. The compressor airfoil as defined in claim 4, wherein said curvature profile of the pressure side surface downstream of the leading edge defines a single radius of curvature.

6. The compressor airfoil as defined in claim 1, wherein the airfoil defines an outer tip and a span-wise length extending between the outer tip and an inner hub along the span-wise axis, the suction side surface portion having the compound curvature profile being disposed along at least a portion of the span-wise length extending radially inwardly from the outer tip.

7. The compressor airfoil as defined in claim 1, wherein the airfoil is a rotor airfoil of the compressor.

8. A compressor of a gas turbine engine, the compressor comprising: at least one compressor rotor having a hub and a plurality of circumferentially spaced rotor blades extending from the hub, the hub defining a central axis of rotation of the compressor rotor, each of the rotor blades having a first airfoil extending through an annular gas path of the compressor, between the hub and an outer blade tip; at least one compressor stator disposed downstream from the compressor rotor, the compressor stator having a plurality of circumferentially spaced stator vanes, each of the stator vanes having a second airfoil extending through the gas path; and at least one of the first and second airfoils comprising: opposed pressure and suction sides extending radially from root to tip and extending axially between leading and trailing edges, a leading edge tip being defined on said leading edge separating the pressure and suction sides, and a plurality of stacked transverse sections having respective chords extending between said leading and trailing edges, the suction side in said transverse sections having a generally convex shape; and wherein at least one of said transverse sections having a profile with a substantially flat section extending between the leading edge and the suction side convex shape, the profile having decreasing curvature from the leading edge towards the substantially flat section to merge therewith, and the substantially flat section merging with the suction side convex shape downstream therefrom, wherein the profile of said at least one of said transverse sections on the suction side further comprises a blended curve surface contiguous with and extending downstream from the flat section, the blended curve surface also being contiguous with and upstream from the suction side convex shape, the blended curve surface having another curvature profile different from that of the substantially flat section and the curvature profile of the leading edge.

9. The compressor as defined in claim 8, wherein the leading edge defines a curvature profile different than the profile of the substantially flat section, the curvature profile of the leading edge defining a continuously increasing radius of curvature.

10. The compressor as defined in claim 9, wherein the leading edge is at least partially elliptically shaped downstream of the leading edge tip.

11. The compressor as defined in claim 8, wherein the at least one of the first and second airfoils define a span-wise length extending between the root and the tip thereof, the profile having the substantially flat section extending between the leading edge and the suction side convex shape being radially disposed along at least a portion of the span-wise length.

12. A compressor airfoil of a gas turbine engine comprising:
a leading edge region defined between a pressure side and a suction side of the airfoil, the leading edge region having a leading edge tip and extending downstream therefrom on both the pressure and suction sides; and
the suction side including a suction side surface portion within the leading edge region extending continuously and uninterrupted to interconnect the leading edge tip and a main suction side airfoil surface disposed downstream of said suction side surface portion, said suction side surface portion having a compound curvature profile, the compound curvature profile comprising at least a curved leading edge surface and a flat chamfered surface contiguous with and extending downstream from the curved leading edge surface, the curved leading edge surface having a first curvature profile and the flat chamfered surface having a second curvature profile different from that of the curved leading edge surface, the second curvature profile of the flat chamfered surface representing an infinite radius of curvature, the flat chamfered surface defining a substantially straight-line profile in a cross-section transverse to the span-wise axis of the airfoil, the compound curvature profile further comprises a blended curve surface continuous with and extending downstream from the flat chamfered surface, the blended curve surface also being contiguous with and upstream from the main suction side airfoil surface, the blended curve surface having a third curvature profile different from both the first and second curvature profiles.

13. The compressor airfoil as defined in claim 12, wherein the first curvature profile of the curved leading edge surface defining a continuously increasing radius of curvature.

14. The compressor airfoil as defined in claim 13, wherein the curved leading edge surface is at least partially elliptically shaped downstream of the leading edge tip.

15. The compressor airfoil as defined in claim 12, wherein the main suction side airfoil surface is at least partially convex and defines a different curvature profile than said first and second curvature profiles of the suction side surface portion within the leading edge region.

16. The compressor airfoil as defined in claim 12, wherein the pressure side surface has a curvature profile in the leading edge region that is different from at least the first and second curvature profiles of the suction side surface portion.

* * * * *